(12) United States Patent
Suzuki

(10) Patent No.: US 10,483,752 B2
(45) Date of Patent: Nov. 19, 2019

(54) POWER SUPPLY APPARATUS AND IMAGE FORMING APPARATUS

(71) Applicant: CANON KABUSHIKI KAISHA, Tokyo (JP)

(72) Inventor: Shota Suzuki, Sendai (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/198,575

(22) Filed: Nov. 21, 2018

(65) Prior Publication Data

US 2019/0165565 A1 May 30, 2019

(30) Foreign Application Priority Data

Nov. 29, 2017 (JP) ................................ 2017-229472

(51) Int. Cl.
| | |
|---|---|
| H02H 7/04 | (2006.01) |
| G03G 15/00 | (2006.01) |
| H02H 1/00 | (2006.01) |
| H02M 3/335 | (2006.01) |
| H02M 1/00 | (2006.01) |
| H02M 1/32 | (2007.01) |

(52) U.S. Cl.
CPC ............ *H02H 7/042* (2013.01); *G03G 15/80* (2013.01); *H02H 1/0007* (2013.01); *H02M 3/33507* (2013.01); H02M 2001/0006 (2013.01); H02M 2001/0032 (2013.01); H02M 2001/327 (2013.01)

(58) Field of Classification Search
CPC .......... H01H 2085/0291; H02H 7/042; H02H 1/0007; H02M 3/33507; G03G 15/80
See application file for complete search history.

(56) References Cited

U.S. PATENT DOCUMENTS

| | | | |
|---|---|---|---|
| 4,942,600 A | 7/1990 | Suzuki | |
| 5,138,655 A | 8/1992 | Takashima | |
| 5,535,418 A | 7/1996 | Suzuki | |
| 5,586,172 A | 12/1996 | Sakurai | |
| 5,594,944 A | 1/1997 | Ogata | |
| 5,602,910 A | 2/1997 | Tsutsui | |
| 5,884,077 A | 3/1999 | Suzuki | |
| 10,069,435 B2 * | 9/2018 | Itoh | ........................ H02M 7/04 |
| 2017/0365994 A1 * | 12/2017 | Kikuchi | ............. H05B 37/0227 |
| 2018/0041130 A1 * | 2/2018 | Kunz | ................ H02M 3/33523 |

FOREIGN PATENT DOCUMENTS

| | | |
|---|---|---|
| JP | 2002-209378 | 7/2002 |
| JP | 2010-206982 | 9/2010 |

* cited by examiner

*Primary Examiner* — Kyle J Moody
(74) *Attorney, Agent, or Firm* — Venable LLP

(57) ABSTRACT

The power supply apparatus has a configuration in which a temperature detection element and a voltage division resistance element are connected in series as a voltage division unit for an output voltage from a secondary side of a transformer of the power supply apparatus, and stops output of the power supply apparatus based on an output from the voltage division unit.

13 Claims, 5 Drawing Sheets

POWER SUPPLY APPARATUS AND IMAGE FORMING APPARATUS

BACKGROUND OF THE INVENTION

Field of the Invention

The present invention relates to a power supply apparatus using an insulation transformer and an image forming apparatus, and particularly relates to an overheat protection circuit.

Description of the Related Art

Recently, miniaturization of a switching power supply apparatus has been required, and in particular, miniaturization of a transformer the ratio of which to a substrate area is large has become a problem. In order to miniaturize the transformer, use of a compact bobbin is necessary, and a width of the bobbin on which a wire rod is wound becomes narrow. Therefore, as compared with a case of using a large bobbin, a thinner wire rod has to be used, and as a result, a resistance value of a winding increases. Further, a core member also needs to be reduced in size, so that heat radiation performance is reduced, and as a result, a temperature of the transformer easily increases due to miniaturization of the transformer. Consequently, especially in a compact transformer, it is important to accurately grasp the temperature of the transformer and perform overheat protection. Japanese Patent Application Laid-Open No. 2002-209378 proposes a method involving fitting a temperature detection element to an element disposed in the vicinity of the transformer, and stopping supply of electric power to a load when the temperature of the transformer reaches a predetermined temperature.

Further, in the switching power supply apparatus, not only the aforementioned miniaturization, but also reduction in electric power consumption at a standby time is required at the same time. In an image forming apparatus such as a laser beam printer, a plurality of voltages may be used at a time of an image forming operation. For example, a drive system such as a motor uses a high voltage (DC 24 V, for example), and a control system such as a microcomputer uses a low voltage (DC 3.3 V, for example). The former is allowed to have a rough voltage value to some extent, but a voltage value of the latter is required to have predetermined voltage precision. In order to output a plurality of voltages as above, in the switching power supply apparatuses, a system is widely used, which supplies a high voltage to be used by the drive system to a load, and converts the voltage generated for the drive system into a highly precise voltage to be used by the control system in a DC/DC converter at a load side. In general, in an image forming apparatus, only the control system operates at the standby time, so that in order to reduce power consumption at the standby time in the switching power supply apparatus, it is essential to enhance efficiency of the DC/DC converter. The efficiency of the DC/DC converter becomes higher as a difference between an input voltage and an output voltage is smaller. Therefore, Japanese Patent Application Laid-Open No. 2010-206982 proposes a switching power supply apparatus using a method involving reducing power consumption by reducing an input voltage of a DC/DC converter, that is, an output voltage of the switching power supply apparatus at a standby time when a power consumption amount of the apparatus at a load side is small.

When the methods proposed by Japanese Patent Application Laid-Open Nos. 2002-209378 and 2010-206982 described above are each used in the switching power supply apparatus, power supply to the load is stopped by the overheat protection circuit before the temperature reaches a specified temperature, and the transformer is protected. However, there is a possibility that a Schottky barrier diode (hereinafter, referred to as SBD) for rectification provided at the secondary side of the transformer exhibits thermal runaway before the overheat protection circuit operates, at the time of a low voltage output such as a standby time. This is because a temperature rise gradient to a load current at a time of the output voltage of the switching power supply apparatus being changed differs between the transformer and the SBD.

Loss of the transformer depends on a primary current and a resistance value of a winding, loss by the electric resistance of the winding is converted into thermal energy, and causes temperature rise of the transformer. When the switching power supply apparatus outputs a low voltage, a primary current is also small in response to a load current. As a result, the temperature rise gradient of the transformer to the load current is gradual. Therefore, in order to increase loss of the transformer to raise the temperature of the transformer, and operate the overheat protection circuit when the output voltage of the switching power supply apparatus is low, a larger load current is required. On the other hand, a loss of the SBD depends on a forward voltage and a load current without depending on the output voltage. Therefore, the temperature rise gradient of the SBD is a gradient corresponding to a load current without depending on the output voltage. As described above, in order to operate the overheat protection circuit when the output voltage of the switching power supply apparatus is decreased to output a low voltage, a larger load current is required. As a result, a large load current flows to the secondary side of the transformer, whereby there is a possibility that the SBD is broken by thermal runaway before the overheat protection circuit operates.

In order to solve the problem, a configuration is conceivable, in which temperature detection elements are included not only in the vicinity of the transformer but also at the SBD, and overheat protection of the SBD is performed. However, a temperature detection element and a protection circuit for protecting the SBD are further required, so that there arises the problem of increase in cost and increase in a required substrate area. Further, use of the SBD with a large rated current is also conceivable, but in this case, there also arises the problem of increase in cost.

SUMMARY OF THE INVENTION

An aspect of the present invention is a power supply apparatus capable of performing overheat protection of a transformer and circuit components with a simple configuration.

Another aspect of the present invention is a power supply apparatus including a transformer having a primary winding and a secondary winding, a switching element connected in series to the primary winding of the transformer, a control unit configured to control an output voltage induced in the secondary winding of the transformer by driving the switching element, and a detection unit configured to detect an overheat state of the transformer, wherein the detection unit has a voltage division unit configured to divide the output voltage, wherein the voltage division unit includes a temperature detection element whose resistance value decreases according to rising of a temperature, and a voltage division resistance element connected in series to the temperature detection element, the voltage division unit installed in a vicinity of the transformer, wherein the detection unit outputs an overheat detection signal to the control unit in a case where the detection unit detects the overheat state of the transformer based on a voltage obtained by dividing the output voltage by the voltage division unit, and the control unit turns off the switching element in response to the overheat detection signal output from the detection unit, and stops generation of the output voltage.

A further aspect of the present invention is an image forming apparatus including an image forming unit configured to perform image formation onto a recording material, and a power supply apparatus configured to supply power to the image forming apparatus, wherein the power supply apparatus includes a transformer having a primary winding and a secondary winding, a switching element connected in series to the primary winding of the transformer, a control unit configured to control an output voltage induced in the secondary winding of the transformer by driving the switching element, and a detection unit configured to detect an overheat state of the transformer, wherein the detection unit has a voltage division unit configured to divide the output voltage, wherein the voltage division unit includes a temperature detection element whose resistance value decreases according to rising of a temperature, and a voltage division resistance element connected in series to the temperature detection element, the voltage division unit installed in a vicinity of the transformer, wherein the detection unit outputs an overheat detection signal to the control unit in a case where the detection unit detects the overheat state of the transformer based on a voltage obtained by dividing the output voltage by the voltage division unit, and the control unit turns off the switching element in response to the overheat detection signal output from the detection unit, and stops generation of the output voltage.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

[Configuration of Switching Power Supply]

Figure 1:
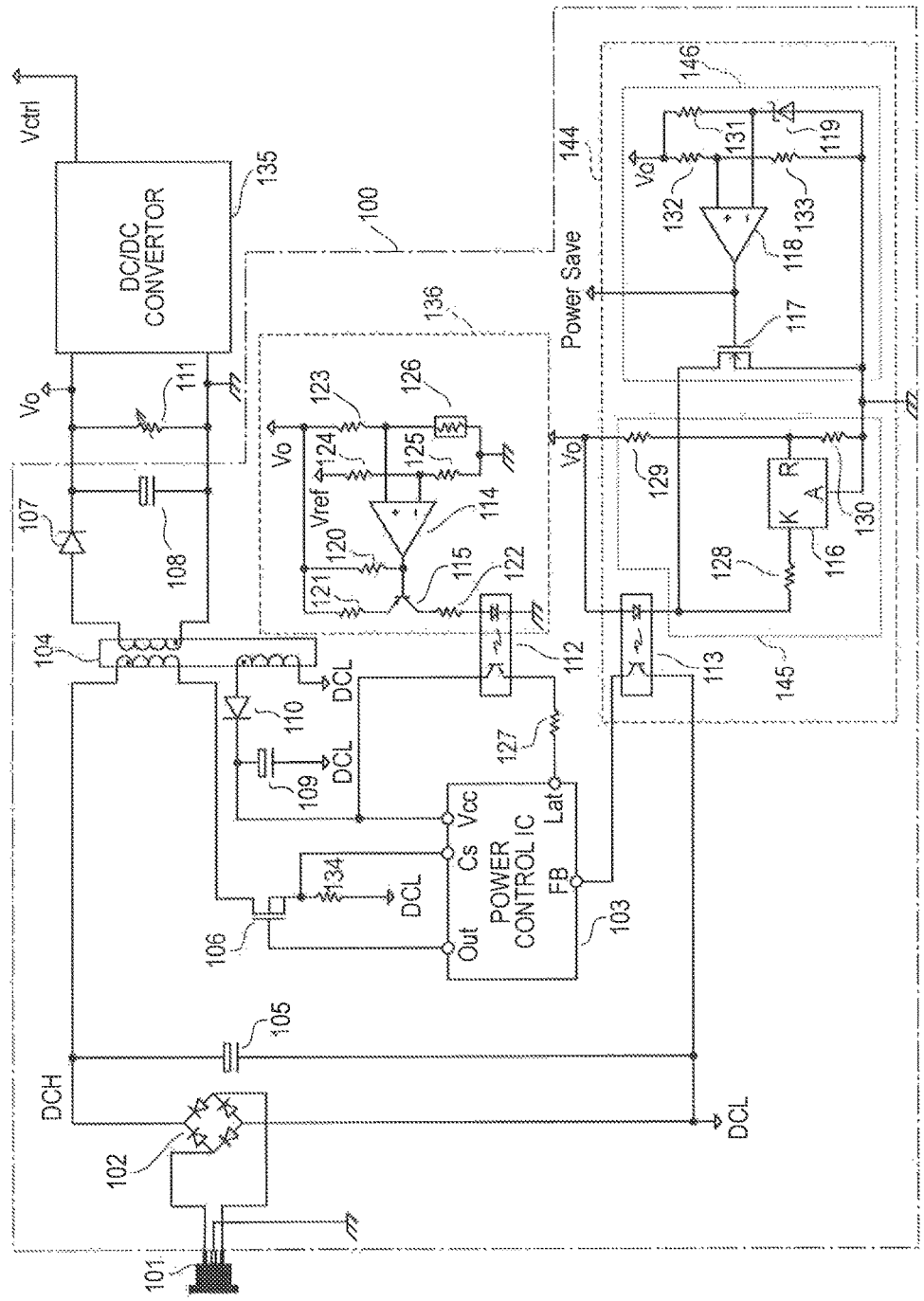
FIG. 1 is a circuit diagram illustrating a configuration of a switching power supply apparatus of embodiment 1.

FIG. 1 is a circuit diagram illustrating a configuration of a switching power supply apparatus 100 of embodiment 1. The switching power supply apparatus 100 (frame portion enclosed by an alternate long and short dashed line in the drawing) is a capacitor input type switching power supply apparatus that rectifies an AC voltage that is input from an inlet 101 in a bridge diode 102, and smoothes the AC voltage into a DC voltage by an electrolytic capacitor 105. The electrolytic capacitor 105 is a smoothing device that smoothes a DC voltage rectified by the bridge diode 102, and a low potential side of the electrolytic capacitor 105 is set as DCL (same potential as ground), and a high potential side is set as DCH. The switching power supply apparatus 100 of the present embodiment outputs an output voltage Vo to an insulated secondary side of a transformer 104 from an input voltage charged in the electrolytic capacitor 105.

The switching power supply apparatus 100 has the transformer 104 including a primary winding and an auxiliary winding at a primary side, and a secondary winding at the secondary side. Energy is supplied to the secondary winding from the primary winding of the transformer 104 by a switching operation of a field effect transistor (hereinafter, referred to as an FET) that is a switching element that will be described later. The auxiliary winding of the transformer 104 rectifies and smoothes a forward voltage of the input voltage applied to the primary winding in a diode 110 and an electrolytic capacitor 109, and supplies a power supply voltage to a Vcc terminal of a power supply control IC 103 that is a control device that controls the switching power supply apparatus 100. Electric power that is supplied to the transformer 104 is controlled by a switching operation of the FET 106 that is connected in series to the primary winding of the transformer 104. On and off control of the FET 106 is performed by a control signal that is output from an Out terminal of the power supply control IC 103. The switching power supply apparatus 100 of the present embodiment is of a flyback type, electric power that is supplied to the transformer 104 is supplied to the secondary side when the FET 106 is in a turn-off state, and a voltage is induced in the secondary winding. The electric power that is supplied to the secondary side by the transformer 104 is rectified and smoothed by an SBD (Schottky barrier diode) 107 and an electrolytic capacitor 108 that are rectifying and smoothing device, and the DC output voltage Vo is generated. Subsequently, the output voltage Vo is supplied to a DC/DC converter 135 that is a load of the switching power supply apparatus 100 and a load 111 such as a motor.

(Control of Output Voltage)

Next, control of the output voltage Vo by the power supply control IC 103 will be described. A high level or a low level of a control signal that is output to a gate terminal of the FET 106 from an Out terminal of the power supply control IC 103 is determined by an input voltage of a Cs terminal and an input voltage of an FB terminal. To the Cs terminal, voltages that are generated at both ends of a current detection resistance 134 by a current flowing in a drain terminal when the FET 106 is in a turn-on state are input. Consequently, an input voltage value of the Cs terminal can also be called an input power that is supplied to the transformer 104. Further, the switching power supply apparatus 100 has a feedback unit 144 (details will be described later) that transmits a deviation between a target voltage value of the output voltage Vo of the transformer 104 and an actual output voltage value to the primary side by a photocoupler 113. The feedback unit 144 changes the input voltage at the FB terminal of the power supply control IC 103 in response to a variation of the output voltage Vo. The power supply control IC 103 outputs a low level signal when the input voltage to the Cs terminal becomes equal to the input voltage to the FB terminal, and outputs a high level signal at the other times, and controls the turn-on and turn-off states of the FET 106 based on the voltage that is input to the FB terminal. Thereby, the input power to the transformer 104 is controlled, and as a result, the voltage value of the output voltage Vo is controlled.

The switching power supply apparatus 100 of the present embodiment is capable of switching the output voltage Vo and supplying the output voltage Vo to the loads. The output voltage Vo capable of being supplied is a DC 24 V (first output voltage) capable of driving not only the DC/DC converter 135 but also the load 111 such as the motor, and a DC 12 V (second output voltage) for operating the DC/DC converter 135 with high efficiency. Note that the DC/DC converter 135 generates DC 3.3 V (power supply voltage Vctrl in the drawing) from the power supply voltage that is input from the switching power supply apparatus 100, and supplies the DC 3.3 V to a control system (for example, CPU, ASIC, etc.).

(Feedback Unit)

The feedback unit 144 that is a feedback device detects a voltage value of the output voltage Vo, and notifies the power supply control IC 103 of deviation information of the output voltage Vo from the target voltage value. The feedback unit 144 is configured by a first circuit unit 145 that monitors an output voltage of DC 24 V, and a second circuit unit 146 that monitors DC 12 V. The first circuit unit 145 is configured by voltage division resistances 129 and 130 that divide the output voltage Vo, a current restriction resistance 128 that restricts a current flowing in an LED of the photocoupler 113, and a shunt regulator 116. The second circuit unit 146 is configured by an FET 117, a comparator 118, a Zener diode 119 that supplies a reference voltage to the comparator 118, resistances 132 and 133 that divide the output voltage Vo, and a current restriction resistance 131. The FET 117 drives a secondary side LED of the photocoupler 113. Further, the comparator 118 compares magnitudes of voltages that are input to two input terminals (plus terminal, and minus terminal), and outputs a comparison result.

Switch of DC 24 V (hereinafter, also simply referred to as 24 V) or DC 12 V (hereinafter, also simply referred to 12 V) of the output voltage Vo is performed by a PowerSave signal (power save signal) that is input from an external control system (for example, CPU and the like). The switching power supply apparatus 100 of the present embodiment is configured such that as the output voltage V0, DC 24 V is output when the PowerSave signal is at a low level, and DC 12 V is output when the PowerSave signal is at a high level. When the PowerSave signal is at a low level, the comparator 118 an output terminal of which is an open collector has an output fixed to a low level. The output terminal of the comparator 118 is connected to a gate terminal of the FET 117, and the output of the comparator 118 is at a low level, so that the FET 117 is brought into a turn-off state. Consequently, feedback control of the power supply control IC 103 to the FB terminal in the case where the output voltage Vo is 24 V is performed by the first circuit unit 145.

In the first circuit unit 145, a voltage obtained by dividing the output voltage Vo by the voltage division resistances 129 and 130 is input to a reference terminal (R in the drawing) of the shunt regulator 116. The shunt regulator 116 is brought into a conducting state when the voltage that is input from the reference terminal becomes higher than a reference voltage that is a target voltage of the output voltage Vo. As a result, a current flows from a cathode terminal K of the shunt regulator 116, and a secondary side LED of the photocoupler 113 is brought into a conducting state via the current restriction resistance 128. Thereby, the primary side photo transistor of the photocoupler 113 is brought into a turn-on state, and an input voltage of the FB terminal of the power supply control IC 103 is reduced. On the other hand, when the voltage of the output voltage Vo becomes lower than the target voltage, no current flows from the cathode terminal K of the shunt regulator 116, and as a result, the secondary side LED of the photocoupler 113 is brought into a non-conducting state. Thereby, the primary side phototransistor of the photocoupler 113 is brought into a turn-off state, and the input voltage of the FB terminal of the power supply control IC 103 rises. In this way, the first circuit unit 145 changes the input voltage of the FB terminal of the power supply control IC 103 in response to a variation of the output voltage Vo of the DC 24 V.

When the PowerSave signal is at a high level, the output from the output terminal of the comparator 118 of the open collector becomes effective. The output terminal of the comparator 118 is connected to the gate terminal of the FET 117, so that turn-on and turn-off states of the FET 117 is controlled by the output of the comparator 118. Therefore, when the PowerSave signal is at a high level, that is, when the output voltage Vo is DC 12 V, feedback control of the state of the output voltage Vo to the power supply control IC 103 is performed by the second circuit unit 146.

In the second circuit unit 146, a voltage obtained by dividing the output voltage Vo by the voltage division resistances 132 and 133 is input to a noninverting input terminal (+) of the comparator 118, and a target voltage is input to an inverting input terminal (−) by the Zener diode 119. Note that in the Zener diode 119, such a Zener voltage is selected that the output voltage Vo of the switching power supply apparatus 100 becomes DC 12 V. Therefore, the voltage that is input to the FB terminal of the power supply control IC 103 via the photocoupler 113 is set so that the output voltage Vo becomes 12 V. Further, when the output voltage Vo is 12 V, the shunt regulator 116 of the first circuit unit 145 is brought into a non-conducting state. By switching the PowerSave signal to a high level or a low level, the switching power supply apparatus 100 is capable of switching two kinds of output voltages Vo.

(Overheat Protection Circuit)

Figure 2:
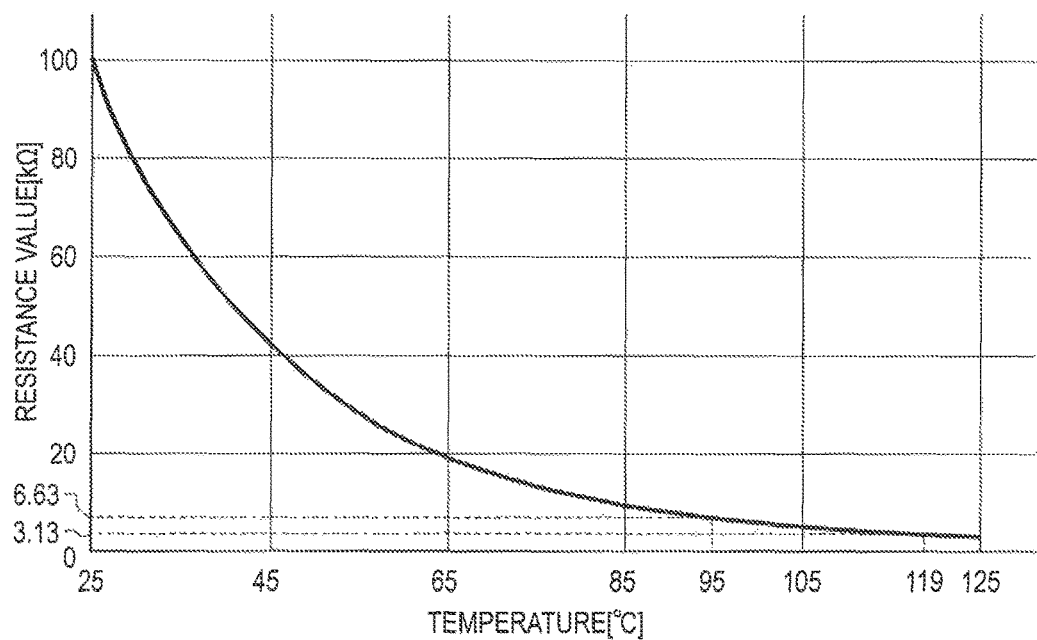
FIG. 2 is a graph illustrating a temperature characteristic of a thermistor of each of embodiments 1 and 2.

Subsequently, an overheat protection circuit 136 that is a detection device configured to detect an overheating state of the transformer 104 will be described. The overheat protection circuit 136 of the present embodiment uses an NTC chip thermistor (hereinafter, referred to as a thermistor) 126 having such a negative temperature coefficient that a resistance value decreases to a temperature rise, as a temperature detection element. FIG. 2 is a graph illustrating a temperature characteristic of the thermistor 126, a vertical axis represents a resistance value [unit: kΩ], and a horizontal axis represents a temperature [unit: ° C.]. As illustrated in FIG. 2, the resistance value of the thermistor 126 is approximately 100 kΩ when the temperature is 25° C., for example. However, as the temperature rises to 45° C., 65° C., 85° C., 105° C. and 125° C., the resistance value of the thermistor 126 reaches approximately 42 kΩ, approximately 19 kΩ, approximately 10 kΩ, approximately 4 kΩ and approximately 3 kΩ respectively, and it is found that with the temperature rise, the resistance value decreases exponentially.

As illustrated in FIG. 1, the overheat protection circuit 136 is configured by a comparator 114, a PNP type transistor 115, a photocoupler 112, a thermistor 126, and resistances 120, 121, 122, 123, 124 and 125. A voltage that is obtained by dividing the output voltage Vo by the resistance 123 that is a voltage division device, and resistance of the thermistor 126 is input to the noninverting input terminal (+) of the comparator 114. Further, a voltage obtained by dividing the reference voltage Vref by the resistances 124 and 125 is input to an inverting input terminal (−) of the comparator 114. Note that in the present embodiment, as the reference voltage Vref, the output voltage Vctrl with high precision which is generated by the DC/DC converter 135 that is the load of the switching power supply apparatus 100, and is supplied to the control system is input. Further, the thermistor 126 is installed in a vicinity of the transformer 104 to measure the temperature of the transformer 104 accurately, and is disposed in such a position that thermal coupling from other main heating elements (for example, the FET 106, the SBD 107 and the like) is reduced as much as possible.

A feature of the overheat protection circuit 136 of the present embodiment lies in that a predetermined voltage is input to one of input terminals (minus terminal) of the comparator 114 that is a comparator, whereas a voltage value obtained by dividing the output voltage Vo by the two voltage division resistances including the thermistor 126 is used for the other input terminal (plus terminal). As described above, the resistance value of the thermistor 126 decreases as the temperature rises. Consequently, when the temperature rises, the voltage that is input to the plus terminal of the comparator 114 decreases, and becomes lower than the predetermined voltage which is input to the minus terminal. As a result, when the temperature detected by the thermistor 126 is in an overheat state higher than the predetermined temperature, a low-level signal is output from the output terminal of the comparator 114.

The output terminal of the comparator 114 is pulled up with the output voltage Vo via the resistance 120, and is connected to a base terminal of the transistor 115. The transistor 115 has an emitter terminal connected to the output voltage Vo via the resistance 121, and a collector terminal connected to an anode terminal of the secondary side LED of the photocoupler 112 via the resistance 122. When a high-level signal is output from the output terminal of the comparator 114, that is, when the temperature of the thermistor 126 is lower than a predetermined temperature, the transistor 115 is in a turn-off state. When a low-level signal (overheat detection signal) is output from the output terminal of the comparator 114, that is, when the temperature of the thermistor 126 is higher than the predetermined temperature, the transistor 115 is brought into a turn-on state. When the transistor 115 is brought into a turn-on state, the secondary side LED of the photocoupler 112 is brought into a conducting state, the primary side photo transistor is brought into a turn-on state, and a high-level signal is input to an Lat terminal of the power supply control IC 103 via a resistance 127. When a high-level signal is input to the Lat terminal, the power supply control IC 103 forcefully stops a switching operation of the FET 106 by setting the output signal from the Out terminal at a low level and stops power supply to the load.

Subsequently, a specific operation of the overheat protection circuit 136 will be described. Here, a resistance value of the thermistor 126 is set as Rth, and resistance values of the resistances 123, 124 and 125 are respectively set as R1, R2 and R3. Then, voltages Vin− and Vin+ of two input terminals (a minus terminal, a plus terminal) of the comparator 114 can be expressed respectively by (expression 1) and (expression 2) as follows.

$$V_{in-} = V_{ref} \times \frac{R_3}{R_2 + R_3} \quad \text{expression 1}$$

$$V_{in+} = V_o \times \frac{R_{th}}{R_1 + R_{th}} \quad \text{expression 2}$$

Figure 3:
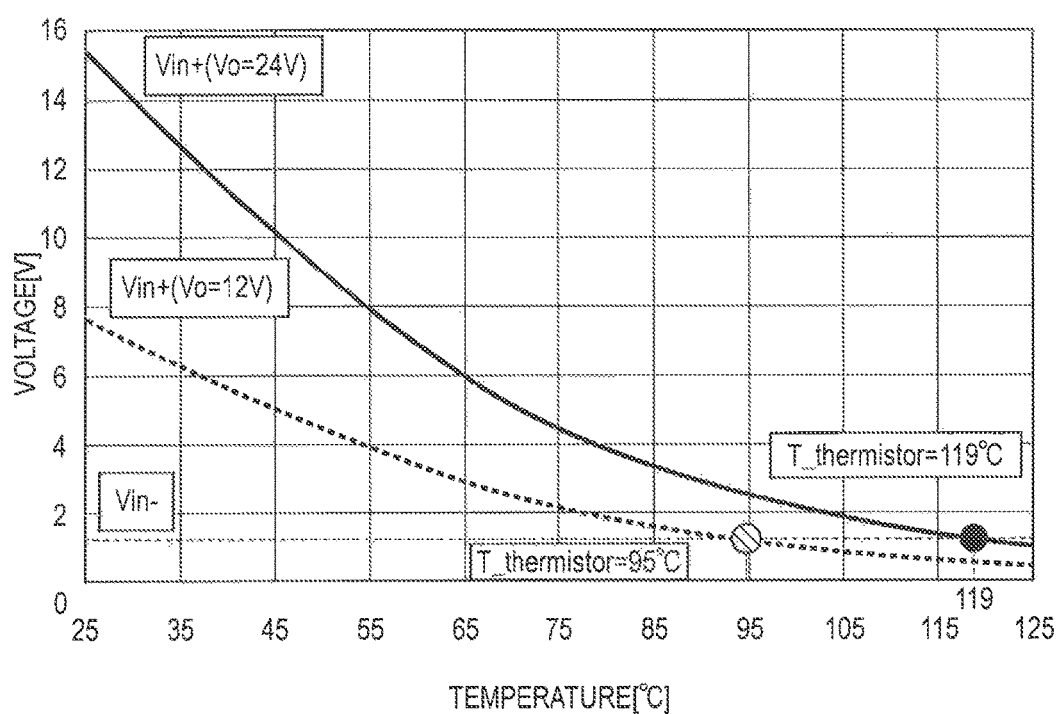
FIG. 3 is a graph illustrating a change in an input terminal voltage to a temperature of a comparator of an overheat protection circuit of embodiment 1.

FIG. 3 is a graph illustrating changes of input voltages of the input terminals (the plus terminal, the minus terminal) of the comparator 114 to the temperature of the thermistor 126 of the overheat protection circuit 136. In FIG. 3, a horizontal axis represents a temperature [unit: ° C.] of the thermistor 126, and a vertical axis represents a voltage [unit: V]. Further, a graph of a solid line is a graph illustrating a change of the input voltage Vin+ of the noninverting input terminal (plus terminal) of the comparator 114 at the time of the output voltage Vo being 24 V. Likewise, a graph of a broken line is a graph illustrating a change of the input voltage Vin+ of the noninverting input terminal (plus terminal) of the comparator 114 at a time of the output voltage Vo being 12 V. Further, a graph of a dotted line is a graph illustrating the input voltage Vin− of the inverting input terminal (minus terminal) of the comparator 114. As illustrated in FIG. 3, as the temperature of the thermistor 126 rises, the input voltage Vin+ of the noninverting input terminal (plus terminal) of the comparator 114 decreases exponentially. The input voltage Vin− of the inverting input terminal (minus terminal) of the comparator 114 has a predetermined voltage value calculated by (expression 1) irrespective of the temperature of the thermistor 126.

Here, the resistance value R1 of the resistance 123 is set at 56 kΩ, the resistance value R2 of the resistance 124 is set at 43 kΩ and the resistance value R3 of the resistance 125 is set at 27 kΩ, and the thermistor 126 is assumed to have a thermal coupling rate of approximately 90% to a self-heating temperature of the transformer 104. Further, the self-heating temperature of the transformer 104 is assumed to be proportional to the output power of the transformer 104. An operation temperature of the overheat protection circuit 136 is obtained by using the resistance values R1, R2 and R3 described above and a parameter of the output voltage Vo. When the reference voltage Vref is set at 3.3 V, and the input voltage Vin− of the inverting input terminal (minus terminal) of the comparator 114 is obtained by (expression 1) described above, Vin− is calculated as Vin− =3.3 V×27 kΩ/(43 kΩ+27 kΩ)≈1.27 V. Accordingly, the input voltage Vin− of the inverting input terminal of the comparator 114 illustrated in FIG. 3 is 1.27 V.

Next, the temperature of the thermistor 126 at which the overheat protection circuit 136 operates when the output voltage Vo is 24 V is calculated. The overheat protection circuit 136 operates when the input voltage Vin+ which is input to the noninverting input terminal (+) of the comparator 114 has a voltage value of the input voltage Vin− or less which is input to the inverting input terminal (−). When the resistance value Rth of the thermistor 126 is calculated by substituting 1.27 V for the input voltage Vin+, 24 V for the output voltage Vo and 56 kΩ for the resistance value R1, in (expression 2) described above, the resistance value Rth is 3.13 kΩ. From FIG. 2, the temperature of the thermistor 126 at a time of the resistance value of the thermistor 126 being 3.13 kΩ is 119° C. A temperature (black dot) of the thermistor 126 at a time of the graph (shown by the solid line) of the input voltage Vin+ at a time of the output voltage Vo being 24 V intersecting the graph (shown by the dotted line) of the input voltage Vin− in FIG. 3 is 119° C. Consequently, when the temperature of the thermistor 126 is 119° C. or more, the comparator 114 outputs a low-level signal, the transistor 115 is brought into a turn-on state, and the secondary side LED of the photocoupler 112 is brought into a conducting state. As a result, a high-level signal is input to the Lat terminal of the power supply control IC 103 via the primary side photo transistor of the photocoupler 112, the power supply control IC 103 stops a switching operation of the FET 106, and power supply to the load is stopped. Since the thermistor 126 has a thermal coupling rate of approximately 90% to the self-heating temperature of the transformer 104, the temperature of the transformer 104 at the time of the temperature of the thermistor 126 being 119° C. is approximately 132° C. (=119° C./0.9(90%)). A temperature in the safety standards at the time of load outside rated load of the power supply of the transformer using a class A wire rod is 150° C., and therefore there is a sufficient margin. Further, an average current flowing in the SBD 107 at this time is 4.0 A.

Subsequently, the temperature of the thermistor 126 at which the overheat protection circuit 136 operates in the case of the output voltage Vo being 12 V is calculated. When 1.27 V is substituted for the input voltage Vin+, 12 V is substituted for the output voltage Vo, and 56 kΩ is substituted for the resistance value R1, and the resistance value Rth of the thermistor 126 is calculated in (expression 2) described above, the resistance value Rth is 6.63 kΩ. According to FIG. 2, a temperature of the thermistor 126 at the time of the resistance value of the thermistor 126 being 6.63 kΩ is 95° C. A temperature (gray circle) of the thermistor 126 at a time of the graph (shown by the broken line) of the input voltage Vin+ at the time of the output voltage Vo being 12 V intersecting the graph (shown by the dotted line) of the input voltage Vin− in FIG. 3 is 95° C. Consequently, when the temperature of the thermistor 126 is 95° C. or more, the overheat protection circuit 136 operates. Since the thermistor 126 has the thermal coupling rate of approximately 90% to the self-heating temperature of the transformer 104, the temperature of the transformer 104 at the time of the temperature of the thermistor 126 being 95° C. is approximately 106° C. (=95° C./0.9(90%)). Further, the average current flowing in the SBD 107 at this time is 5.5 A. The current value flowing in the SBD 107 is smaller when the output voltage Vo is 24 V as compared with the case in which the output voltage Vo is 12 V.

In the overheat protection circuit 136 of the present embodiment, by using the thermistor the resistance value of which decreases in response to the temperature, for the resistance that divides the output voltage Vo, the overheat state of the transformer 104 is detected even when the output voltage Vo is a low voltage, and the transformer can be protected from overheat. For example, in the case of the overheat protection circuit using no thermistor, an average current value flowing in the SBD 107 when the overheat state of the transformer 104 is detected and the overheat protection circuit operates is 8.0 A. When a relationship between the heat generation amount and the heat radiation amount of the SBD 107 satisfies the heat generation amount>the heat radiation amount, a leak current of the SBD 107 increases, and when the state continues for a predetermined time or more, the SBD 107 exhibits thermal runaway. That is, the overheat protection circuit 136 makes it possible to reduce the average current flowing in the SBD 107 by 2.5 A (=8.0 A−5.5 A) while satisfying the temperature in the safety standards of the transformer 104. As a result, the SBD 107 can be prevented from exhibiting thermal runaway before the overheat protection circuit 136 operates.

As described above, according to the present embodiment, overheat protection of the transformer and the circuit components can be performed with the simple configuration.

In embodiment 1, the overheat protection circuit that detects the overheat state of the transformer by using the comparator is described. In embodiment 2, an overheat protection circuit that detects the overheat state of the transformer by using the CPU instead of the comparator will be described.

[Configuration of Switching Power Supply]

Figure 4:
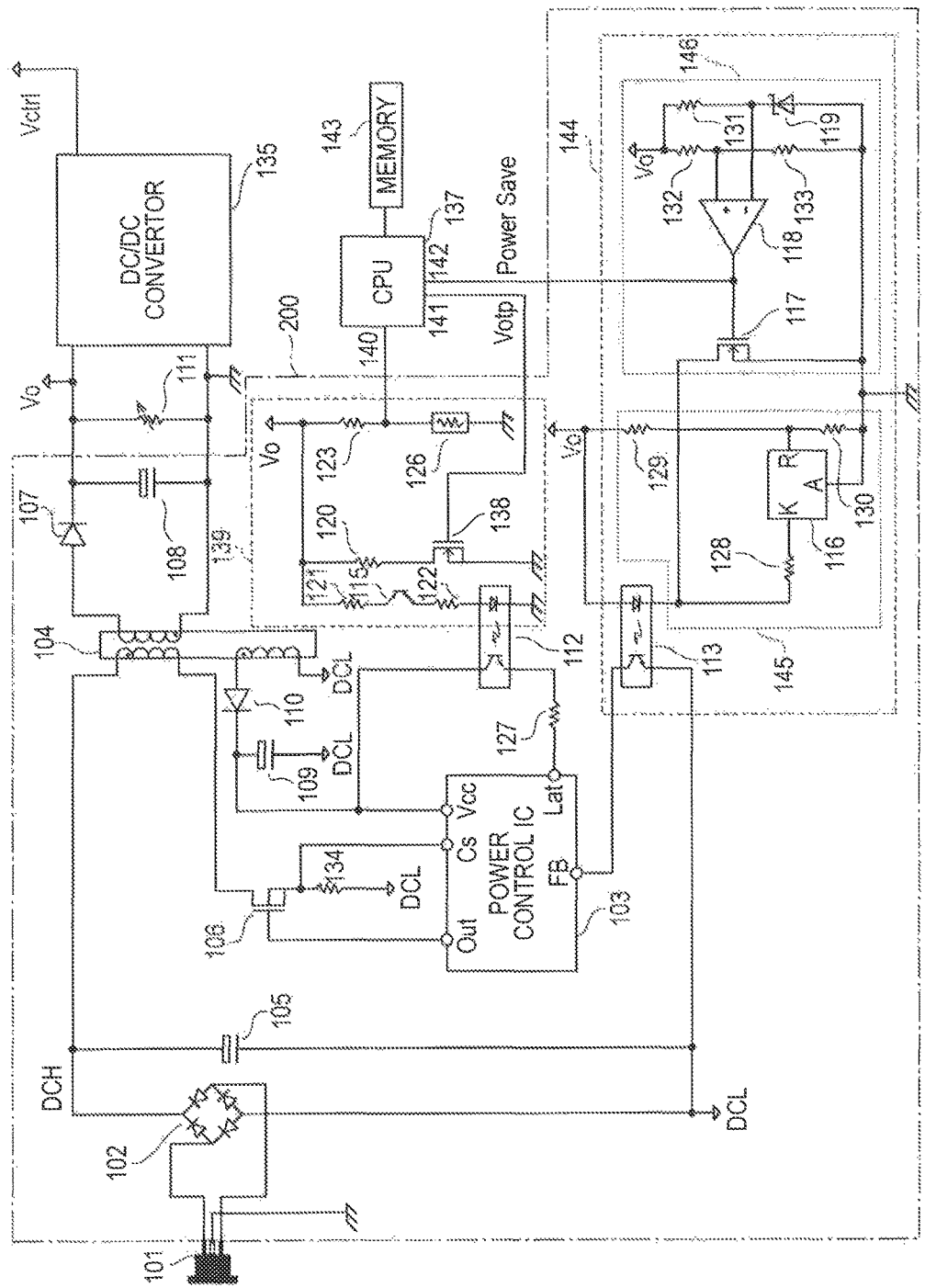
FIG. 4 is a circuit diagram illustrating a configuration of a switching power supply apparatus of embodiment 2.

FIG. 4 is a circuit diagram illustrating a configuration of a switching power supply apparatus 200 (a frame portion enclosed by an alternate long and short dash line in the drawing) of the present embodiment. As compared with the overheat protection circuit 136 of the switching power supply apparatus 100 illustrated in FIG. 1 of embodiment 1, an overheat protection circuit 139 of the switching power supply apparatus 200 of the present embodiment differs in that the comparator 114 and the resistances 124 and 125 are deleted and an FET 138 is added. Further, the CPU 137 illustrated in FIG. 4 is a CPU of an electronic apparatus at a load side to which the output voltage Vo is supplied. When the CPU 137 detects an overheat state of the transformer 104 via the overheat protection circuit 139, the CPU 137 operates the overheat protection circuit 139, and switches the output voltage Vo. The other circuit configurations of the switching power supply apparatus 200 are similar to the circuit configurations of the switching power supply apparatus 100 in embodiment 1, so that the same reference signs will be used for the same circuit components, and explanation here will be omitted.

(Overheat Protection Circuit)

To an input port 140 of the CPU 137, a voltage obtained by dividing the output voltage Vo by the thermistor 126 and the resistance 123 is input. Further, the CPU 137 has a memory 143 that is a storage device, and in the memory 143, a first temperature (120° C.) and a second temperature (95° C.) of the thermistor 126 at which it is determined as an overheat state respectively when the output voltage Vo is 24 V and 12 V are stored in advance. Further, in the memory 143, data in which the resistance value and the temperature of the thermistor 126 are associated with each other illustrated in FIG. 2 is stored. Further, the CPU 137 has an output port 142 that outputs a PowerSave signal, outputs a low-level signal when the output voltage Vo is 24 V, and outputs a high-level signal when the output voltage Vo is 12 V.

When the output voltage Vo is 24 V, the CPU 137 outputs a low-level PowerSave signal from the output port 142, and calculates the resistance value of the thermistor 126 by (expression 2) described above based on a voltage input in the input port 140. Subsequently, the CPU 137 obtains the temperature of the thermistor 126 based on the resistance value of the thermistor 126 that is calculated, and the correspondence data of the resistance value of the thermistor 126 to the temperature that is stored in the memory 143. When the temperature of the thermistor 126 that is obtained is a first temperature or more (120° C. or more), the CPU 137 outputs an overheat protection operation start signal (Votp signal) at a high level that is also an overheat detection signal from an output port 141 in order to operate the overheat protection circuit 139.

The output port 141 of the CPU 137 is connected to a gate terminal of the FET 138. Further, the FET 138 has a source terminal connected to the base terminal of the transistor 115, and a drain terminal connected to ground. When the overheat protection operation start signal at a high level is output from the output port 141 of the CPU 137, the FET 138 is brought into a turn-on state, as a result of which, the base terminal of the transistor 115 reaches a low level, and the transistor 115 is brought into a turn-on state. When the transistor 115 is brought into a turn-on state, the secondary side LED of the photocoupler 112 is brought into a conducting state, the primary side photo transistor is brought into a turn-on state, and a high-level signal is input to the Lat terminal of the power supply control IC 103 via the resistance 127. When the high-level signal is input to the Lat terminal, the power supply control IC 103 forcefully stops the switching operation of the FET 106 by setting the output signal from the Out terminal at a low level, and stops power supply to the load.

When the output voltage is 12 V, the CPU 137 outputs a PowerSave signal at a high level, and calculates the resistance value of the thermistor 126 by (expression 2) described above based on the voltage that is input to the input port 140. Subsequently, the CPU 137 obtains the temperature of the thermistor 126 based on the resistance value of the thermistor 126 which is calculated, and the resistance value to the temperature data of the thermistor 126 which is stored in the memory 143. Subsequently, when the obtained temperature of the thermistor 126 is the second temperature or more (95° C. or more), the CPU 137 outputs the Votp signal at a high level from the output port 141 in order to operate the overheat protection circuit 139. Thereby, the FET 138 transitions to a turn-on state, as a result, the transistor 115 also transitions to a turn-on state, a high-level signal is input to the Lat terminal via the photocoupler 112, and power supply control by the power supply control IC 103 is stopped.

As described above, in the present embodiment, the SBD 107 can be also prevented from exhibiting thermal runaway before the overheat protection circuit 139 operates as in embodiment 1. Note that in the present embodiment, the CPU 137 is described as the CPU of the external electronic apparatus, but may be a CPU provided in the switching power supply apparatus 200, for example.

As described above, according to the present embodiment, overheat protection of the transformer and the circuit components can be performed with the simple structure.

The switching power supply apparatus described in each of embodiments 1 and 2 is applicable, for example, as a low-voltage power supply of an image forming apparatus, that is, a power supply apparatus that supplies power to the controller (control unit) and a drive unit such as a motor. Hereinafter, a configuration of the image forming apparatus to which the power supply apparatus in each of embodiments 1 and 2 is applied will be described.

[Configuration of Image Forming Apparatus]

Figure 5:
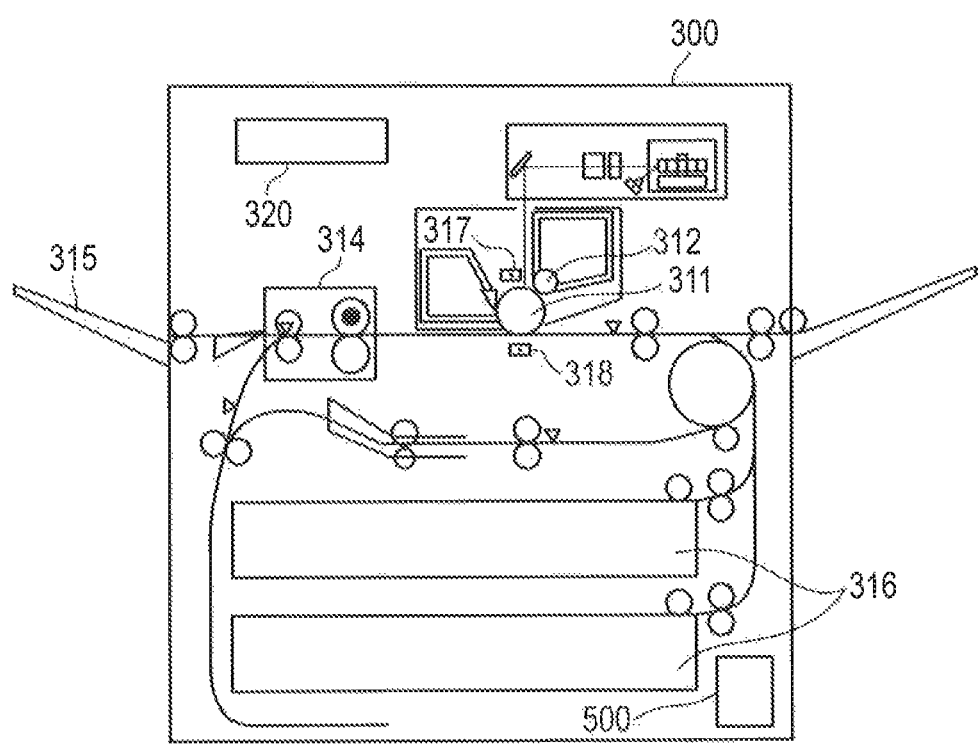
FIG. 5 is a sectional view illustrating a configuration of an image forming apparatus of embodiment 3.

As an example of the image forming apparatus, a laser beam printer will be described as an example. FIG. 5 illustrates a schematic configuration of a laser beam printer that is an example of an electrophotography type printer. A laser beam printer 300 includes a photosensitive drum 311 as an image bearing member on which an electrostatic latent image is formed, a charging unit 317 (charging device) that uniformly charges the photosensitive drum 311, and a developing unit 312 (developing device) that develops the electrostatic latent image formed on the photosensitive drum 311. Subsequently, a toner image developed on the photosensitive drum 311 is transferred onto a sheet (not illustrated) as a recording material supplied from a cassette 316 by a transfer unit 318 (transfer device), and the toner image transferred onto the sheet is fixed by the fixing device 314 to be discharged to a tray 315. The photosensitive drum 311, the charging unit 317, the developing unit 312 and the transfer unit 318 are an image forming unit. Further, the laser beam printer 300 includes a power supply apparatus 500 that corresponds to the switching power supply apparatuses 100 and 200 described in embodiments 1 and 2. Note that the image forming apparatus to which the power supply apparatus 500 is applicable is not limited to what is illustrated in FIG. 5, but may be an image forming apparatus including a plurality of image forming units, for example. Further, the image forming apparatus may be an image forming apparatus including a primary transfer unit that transfers the toner image on the photosensitive drum 311 onto an intermediate transfer belt, and a secondary transfer unit that transfers the toner image on the intermediate transfer belt onto a sheet.

The laser beam printer 300 includes a controller 320 that controls an image forming operation by an image forming unit, and a sheet conveying operation. The controller 320 is supplied with power via the DC/DC converter 135 from the power supply apparatus 500 that corresponds to the switching power supply apparatuses 100 and 200 described in embodiments 1 and 2. Further, the power supply apparatus 500 that corresponds to the switching power supply apparatuses 100 and 200 described in embodiments 1 and 2 supplies power to a drive unit (load 111 in FIGS. 1 and 2, for example) such as a motor for rotating the photosensitive drum 311 or driving various rollers and the like that convey a sheet. Further, in the power supply apparatus 500 corresponding to the switching power supply apparatuses 100 and 200 described in embodiments 1 and 2, the controller 320 corresponding to the external CPU in embodiment 1 and the CPU 137 in embodiment 2 outputs the PowerSave signal that instructs switch of the output voltage Vo. Further, the controller 320 corresponding to the CPU 137 in embodiment 2 detects the temperature of the thermistor 126 and outputs the Votp signal that operates the overheat protection circuit 139. Thereby, the controller 320 can control the power supply apparatus 500.

As described above, according to the present embodiment, overheat protection of the transformer and the circuit components can be performed with the simple structure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-229472, filed Nov. 29, 2017, which is hereby incorporated by reference herein in its entirety.

What is claimed is:

1. A power supply apparatus comprising:
a transformer having a primary winding and a secondary winding;
a switching element connected in series to the primary winding of the transformer;
a control unit configured to control an output voltage induced in the secondary winding of the transformer by driving the switching element;
a feedback unit configured to feedback a detection result of a voltage induced on the secondary winding to the control unit; and
a detection unit configured to detect an overheat state of the transformer and output an overheat signal to the control unit,
wherein the detection unit has a voltage division unit configured to divide the output voltage,
wherein the voltage division unit includes a temperature detection element to detect a temperature of the transformer, and a resistance element connected in series to the temperature detection element, the voltage division unit disposed in a vicinity of the transformer, wherein the detection unit outputs the overheat detection signal to the control unit in a case where the detection unit detects the overheat state of the transformer based on a voltage obtained by dividing the output voltage by the voltage division unit, and the control unit turns off the switching element in response to the overheat detection signal output from the detection unit, and stops driving of the switching element.

2. The power supply apparatus according to claim 1, wherein the control unit controls the switching element in response to a switch signal that switches the output voltage, and induces one of a first output voltage and a second output voltage lower than the first output voltage in the secondary winding.

3. The power supply apparatus according to claim 2, comprising a feedback unit configured to output information corresponding to a deviation between the output voltage and a target voltage corresponding to the output voltage to the control unit, wherein the feedback unit includes a first circuit unit configured to operate when the output voltage is the first output voltage, and output the information corresponding to the deviation between the first output voltage and the target voltage corresponding to the first output voltage, and a second circuit unit configured to operate when the output voltage is the second output voltage, and output the information corresponding to the deviation between the second output voltage and the target voltage corresponding to the second output voltage, and wherein the control unit controls the switching element to one of a turn-on state and a turn-off state based on the information output from the feedback unit.

4. The power supply apparatus according to claim 3, wherein the switch signal is input from an external apparatus different from the power supply apparatus.

5. The power supply apparatus according to claim 4, wherein the temperature detection element is a thermistor, wherein the detection unit detects the overheat state of the transformer based on a voltage obtained by dividing the first output voltage by the voltage division unit based on a resistance value of the voltage division resistance element, and a resistance value of the thermistor at a time when a temperature of the thermistor is a first temperature in a case where the output voltage is the first output voltage, and wherein the detection unit detects the overheat state of the transformer based on a voltage obtained by dividing the second output voltage by the voltage division unit based on the resistance value of the voltage division resistance element, and the resistance value of the thermistor at a time when the temperature of the thermistor is a second temperature lower than the first temperature in a case where the output voltage is the second output voltage.

6. The power supply apparatus according to claim 3, wherein the temperature detection element is a thermistor, wherein the detection unit has a control unit for detecting that the transformer is in an overheat state, and the control unit detects an overheat state of the transformer based on a voltage obtained by dividing the first output voltage by the voltage division unit in the case where the output voltage is the first output voltage, and wherein the detection unit detects an overheat state of the transformer based on a voltage obtained by dividing the second output voltage by the voltage division unit in the case where the output voltage is the second output voltage.

7. The power supply apparatus according to claim 6, wherein the control unit has a storage unit configured to store data in which a resistance value of the thermistor and a temperature of the thermistor are associated with each other, wherein the control unit obtains a temperature of the thermistor corresponding to the resistance value of the thermistor calculated based on the voltage divided by the voltage division unit, from the data stored in the storage unit, and wherein the control unit outputs the overheat detection signal to the control unit when the output voltage is the first output voltage in a case where the temperature obtained in the control unit, of the thermistor is equal to or more than the first temperature, or when the output voltage is the second output voltage in a case where the temperature obtained in the control unit, of the thermistor is equal to or more than the second temperature.

8. The power supply apparatus according to claim 7, wherein the control unit outputs the switch signal to the feedback unit to switch the output voltage to one of the first voltage and the second voltage.

9. The power supply apparatus according to claim 5, wherein the temperature of the thermistor changes according to the temperature of the transformer, wherein the first temperature is the temperature of the thermistor at a time when the transformer is in an overheat state in the case where the output voltage is the first output voltage, and the second temperature is the temperature of the thermistor at a time when the transformer is in an overheat state in the case where the output voltage is the second output voltage.

10. The power supply apparatus according to claim 8, wherein the temperature of the thermistor changes according to the temperature of the transformer, wherein the first temperature is the temperature of the thermistor at a time when the transformer is in an overheat state in the case where the output voltage is the first output voltage, and the second temperature is the temperature of the thermistor at a time when the transformer is in an overheat state in the case where the output voltage is the second output voltage.

11. An image forming apparatus comprising:

an image forming unit configured to perform image formation onto a recording material; and a power supply apparatus configured to supply power to the image forming apparatus, wherein the power supply apparatus includes:

a transformer having a primary winding and a secondary winding;

a switching element connected in series to the primary winding of the transformer;

a control unit configured to control an output voltage induced in the secondary winding of the transformer by driving the switching element;

a feedback unit configured to feedback a detection result of a voltage induced on the secondary winding to the control unit; and a detection unit configured to detect an overheat state of the transformer and output an overheat signal to the control unit, wherein the detection unit has a voltage division unit configured to divide the output voltage, wherein the voltage division unit includes a temperature detection element to detect a temperature of the transformer, and a resistance element connected in series to the temperature detection element, the voltage division unit disposed in a vicinity of the transformer, wherein the detection unit outputs an overheat detection signal to the control unit in a case where the detection unit detects the overheat state of the transformer based on a voltage obtained by dividing the output voltage by the voltage division unit, and the control unit turns off the switching element in response to the overheat detection signal output from the detection unit, and stops driving of the switching element.

12. The image forming apparatus according to claim 11 comprising:

a controller in which power is supplied from the power supply apparatus, the controller configured to control the image forming unit, wherein the controller outputs the switch signal to switch the output voltage to one of the first voltage and the second voltage, and the control unit controls an operation of the switching element to switch the output voltage in response to the switch signal.

13. The image forming apparatus according to claim 11 wherein the control unit is a controller to which power is supplied from the power supply apparatus, the controller configured to control the image forming unit.

* * * * *